US009530421B2

(12) United States Patent
Jot et al.

(10) Patent No.: US 9,530,421 B2
(45) Date of Patent: Dec. 27, 2016

(54) ENCODING AND REPRODUCTION OF THREE DIMENSIONAL AUDIO SOUNDTRACKS

(75) Inventors: Jean-Marc Jot, Aptos, CA (US); Zoran Fejzo, Los Angeles, CA (US); James D. Johnston, Redmond, WA (US)

(73) Assignee: DTS, Inc., Calabasas, CA (US)

(*) Notice: Subject to any disclaimer, the term of this patent is extended or adjusted under 35 U.S.C. 154(b) by 463 days.

(21) Appl. No.: 14/026,984

(22) PCT Filed: Mar. 15, 2012
(Under 37 CFR 1.47)

(86) PCT No.: PCT/US2012/029277
§ 371 (c)(1),
(2), (4) Date: Dec. 6, 2013

(87) PCT Pub. No.: WO2012/125855
PCT Pub. Date: Sep. 20, 2012

(65) Prior Publication Data

US 2014/0350944 A1 Nov. 27, 2014

Related U.S. Application Data

(60) Provisional application No. 61/453,461, filed on Mar. 16, 2011.

(51) Int. Cl.
*G06F 17/00* (2006.01)
*G10L 19/008* (2013.01)
(Continued)

(52) U.S. Cl.
CPC ............ *G10L 19/008* (2013.01); *G10L 19/20* (2013.01); *H04S 3/008* (2013.01); *G10L 19/173* (2013.01);
(Continued)

(58) Field of Classification Search
CPC . G10L 19/008; H04S 2400/01; H04S 2400/03
See application file for complete search history.

(56) References Cited

U.S. PATENT DOCUMENTS

| | | | |
|---|---|---|---|
| 7,617,110 | B2 | 11/2009 | Kim et al. |
| 2005/0192799 | A1 | 9/2005 | Kim et al. |

(Continued)

FOREIGN PATENT DOCUMENTS

| | | | |
|---|---|---|---|
| CN | 1684371 | A | 10/2005 |
| CN | 101636917 | A | 1/2010 |

(Continued)

OTHER PUBLICATIONS

Office Action, dated Oct. 10, 2014, in corresponding Chinese Application No. 201280021295.X.

(Continued)

*Primary Examiner* — Joseph Saunders, Jr.
(74) *Attorney, Agent, or Firm* — Blake Welcher; William Johnson; Craig S. Fischer

(57) ABSTRACT

The present invention provides a novel end-to-end solution for creating, encoding, transmitting, decoding and reproducing spatial audio soundtracks. The provided soundtrack encoding format is compatible with legacy surround-sound encoding formats, so that soundtracks encoded in the new format may be decoded and reproduced on legacy playback equipment with no loss of quality compared to legacy formats.

19 Claims, 7 Drawing Sheets

(51) Int. Cl.

| | |
|---|---|
| ***H04S 3/00*** | (2006.01) |
| ***G10L 19/20*** | (2013.01) |
| *G10L 19/16* | (2013.01) |

(52) U.S. Cl.

CPC ............ *H04S 3/004* (2013.01); *H04S 2400/01* (2013.01); *H04S 2400/03* (2013.01); *H04S 2420/01* (2013.01)

(56) References Cited

U.S. PATENT DOCUMENTS

| | | | |
|---|---|---|---|
| 2007/0002971 | A1 | 1/2007 | Purnhagen et al. |
| 2007/0223708 | A1 | 9/2007 | Villemoes et al. |
| 2009/0110203 | A1 | 4/2009 | Taleb |
| 2009/0262957 | A1 | 10/2009 | Oh et al. |
| 2009/0326958 | A1 | 12/2009 | Kim et al. |
| 2010/0014692 | A1 | 1/2010 | Schreiner et al. |
| 2010/0106271 | A1 | 4/2010 | Oh et al. |
| 2010/0142731 | A1 | 6/2010 | Oh et al. |

FOREIGN PATENT DOCUMENTS

| | | | |
|---|---|---|---|
| WO | 2008114985 | A1 | 9/2008 |
| WO | 2009049895 | A1 | 4/2009 |

OTHER PUBLICATIONS

Jean-Marc Jot, "Real-time spatial processing of sounds for music, multimedia and interactive human-computer interfaces," Multimedia Systems, 7:55-69 (1999); Los Angeles, CA; USA.

John M. Chowning; "The Simulation of Moving Sound Sources," The Center for Computer Research in Music and Acoustics, (digital version Oct. 3, 2001), Stanford, CA, USA, (first published J.M. Chowning. The Simulation of Moving Sound Sources, J. Audio Eng. Soc. 19, Jan. 2-6, 1971).

Bruel & Kjaer Dictionary; http://www.bksv.com/library/dictionary.aspx?key=S&st=S; Topic: Sound Attenuation in Air; p. 4, Jan. 16, 2015.

Scott Hunter Stark; "Live Sound Reinforcement," Attenuation of sound in air per 100' (30m), p. 54, Mix Pro Audio Series, Nov. 1, 2002, published by Mix Books, Auburn Hills, Michigan, US.

Engdegord J. et al.: "Spatial Audio Object Coding (SAOC)—The Upcoming MPEG Standard on Parametric Object Based Audio Coding," 124th AES Convention, Audio Engineering Society, paper 7377, May 17, 2008 (May 17, 2008), pp. 1-15, XP002541458.

Extended European Search Report in corresponding European Patent Application No. 12 757 223.8-1557; dated Feb. 6, 2015.

FIG. 1C
PRIOR ART
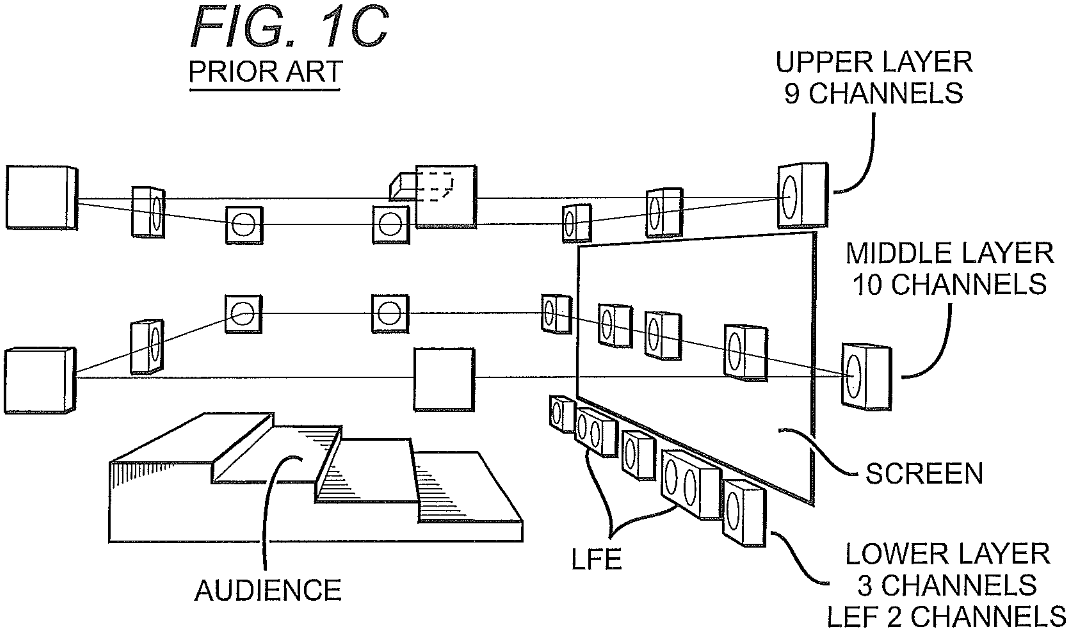
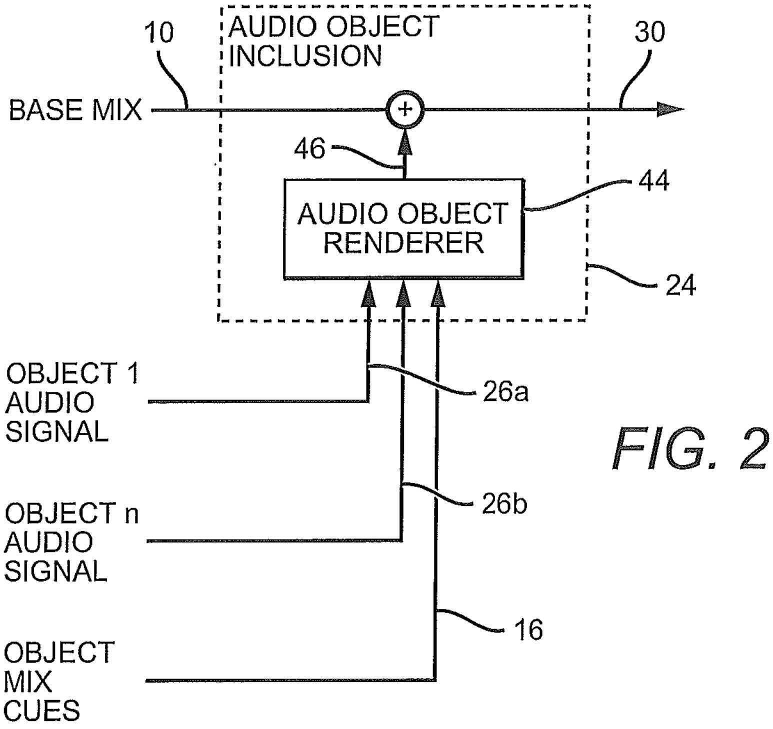
FIG. 2

FIG. 3
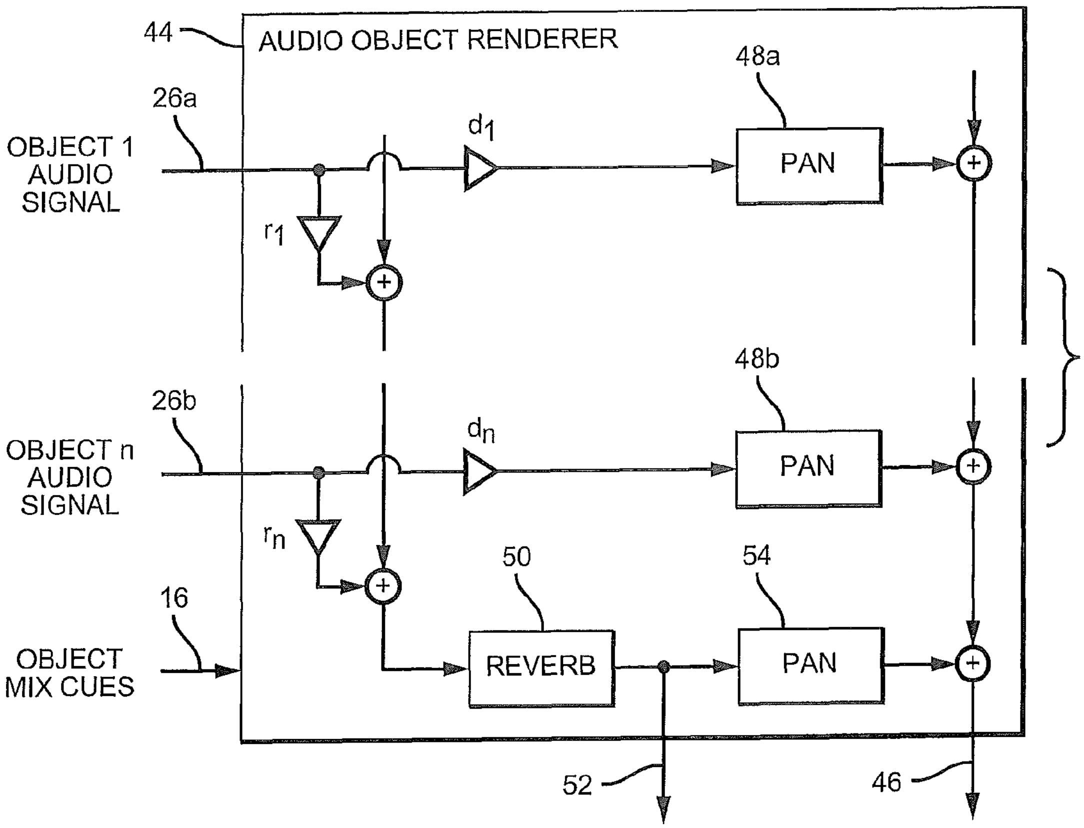
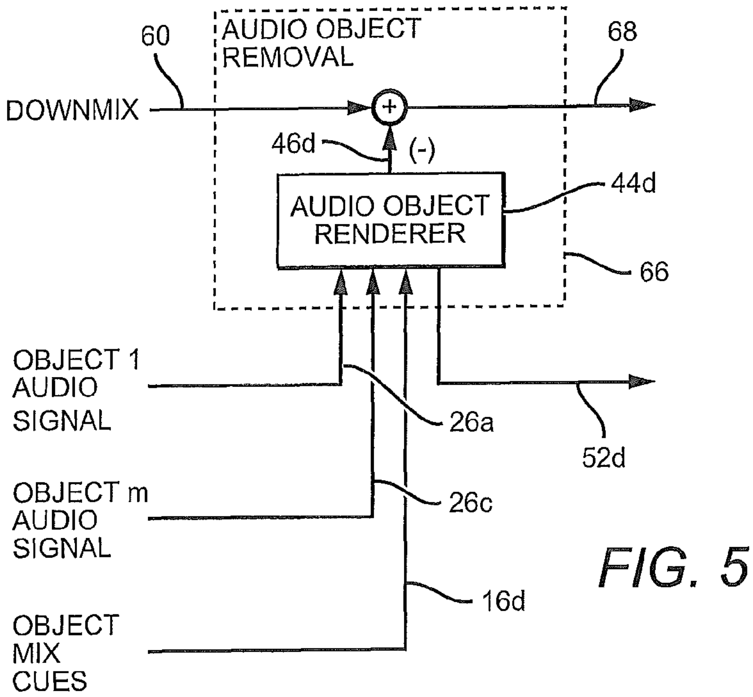
FIG. 5

ENCODING AND REPRODUCTION OF THREE DIMENSIONAL AUDIO SOUNDTRACKS

CROSS-REFERENCE TO RELATED APPLICATIONS

This application is the National Stage entry under 35 U.S.C. §371 that claims priority of International Application No. PCT/US2012/029277, filed Mar. 15, 2012, entitled ENCODING AND REPRODUCTION OF THREE DIMENSIONAL AUDIO SOUNDTRACKS, to inventors Jean-Marc Jot et al., now pending, which claims priority to U.S. Provisional Patent Application Ser. No. 61/453,461 filed Mar. 16, 2011, entitled ENCODING AND REPRODUCTION OF THREE DIMENSIONAL AUDIO SOUNDTRACKS, to inventors Jean-Marc Jot et al.

STATEMENT RE: FEDERALLY SPONSORED RESEARCH/DEVELOPMENT

Not Applicable

BACKGROUND

1. Technical Field

The present invention relates to the processing of audio signals, more particularly, to the encoding and reproduction of three dimensional audio soundtracks.

2. Description of the Related Art

Spatial audio reproduction has interested audio engineers and the consumer electronics industry for several decades. Spatial sound reproduction requires a two-channel or multi-channel electro-acoustic system (loudspeakers or headphones) which must be configured according to the context of application (e.g. concert performance, motion picture theater, domestic hi-fi installation, computer display, individual head-mounted display), further described in Jot, Jean-Marc, "*Real-time Spatial Processing of Sounds for Music, Multimedia and Interactive Human-Computer Interfaces*," IRCAM, 1 place Igor-Stravinsky 1997, [hereinafter (Jot, 1997)], herein incorporated by reference. In association with this audio playback system configuration, a suitable technique or format must be defined to encode directional localization cues in a multi-channel audio signal for transmission or storage.

A spatially encoded soundtrack may be produced by two complementary approaches:

(a) Recording an existing sound scene with a coincident or closely-spaced microphone system (placed essentially at or near the virtual position of the listener within the scene). This can be, e.g., a stereo microphone pair, a dummy head, or a Soundfield microphone. Such a sound pickup technique can simultaneously encode, with varying degrees of fidelity, the spatial auditory cues associated to each of the sound sources present in the recorded scene, as captured from a given position.

(b) Synthesizing a virtual sound scene. In this approach, the localization of each sound source and the room effect are artificially reconstructed by use of a signal processing system, which receives individual source signals and provides a parameter interface for describing the virtual sound scene. An example of such a system is a professional studio mixing console or digital audio workstation (DAW). The control parameters may include the position, orientation and directivity of each source, along with an acoustic characterization of the virtual room or space. An example of this approach is the post-processing of a multi-track recording using a mixing console and signal processing modules such as artificial reverberators as illustrated in FIG. 1A.

The development of audio recording and reproduction techniques for the motion picture and home video entertainment industry has resulted in the standardization of multi-channel "surround sound" recording formats (most notably the 5.1 and 7.1 formats). Surround sound formats presuppose that audio channel signals should be fed respectively to loudspeakers arranged in the horizontal plane around the listener in a prescribed geometrical layout, such as the "5.1" standard layout shown in FIG. 1B (where LF, CF, RF, RS, LS and SW respectively denote the left-front, center-front, right-front, right-surround, left-surround and subwoofer loudspeakers). This assumption intrinsically limits the ability to reliably and accurately encode and reproduce three-dimensional audio cues of natural sound fields, including the proximity of sound sources and their elevation above the horizontal plane, and the sense of immersion in the spatially diffuse components of the sound field such as room reverberation.

Various audio recording formats have been developed for encoding three-dimensional audio cues in a recording. These 3-D audio formats include Ambisonics and discrete multi-channel audio formats comprising elevated loudspeaker channels, such as the NHK 22.2 format illustrated in FIG. 1C. However, these spatial audio formats are incompatible with legacy consumer surround sound playback equipment: they require different loudspeaker layout geometries and different audio decoding technology. Incompatibility with legacy equipment and installations is a critical obstacle to the successful deployment of existing 3-D audio formats.

Multi-channel Audio Coding Formats

Various multi-channel digital audio formats, such as DTS-ES and DTS-HD from DTS, Inc. of Calabasas, Calif., address these problems by including in the soundtrack data stream a backward-compatible downmix that can be decoded by legacy decoders and reproduced on existing playback equipment, and a data stream extension, ignored by legacy decoders, that carries additional audio channels. A DTS-HD decoder can recover these additional channels, subtract their contribution in the backward-compatible downmix, and render them in a target spatial audio format different from the backward-compatible format, which can include elevated loudspeaker positions. In DTS-HD, the contribution of additional channels in the backward-compatible mix and in the target spatial audio format are described by a set of mixing coefficients (one for each loudspeaker channel). The target spatial audio formats for which the soundtrack is intended must be specified at the encoding stage.

This approach allows for the encoding of a multi-channel audio soundtrack in the form of a data stream compatible with legacy surround sound decoders and one or several alternative target spatial audio formats also selected during the encoding/production stage. These alternative target formats may include formats suitable for the improved reproduction of three-dimensional audio cues. However, one limitation of this scheme is that encoding the same soundtrack for another target spatial audio format requires returning to the production facility in order to record and encode a new version of the soundtrack, that is mixed for the new format.

Object-Based Audio Scene Coding

Object-based audio scene coding offers a general solution for soundtrack encoding independent from the target spatial audio format. An example of object-based audio scene coding system is the MPEG-4 Advanced Audio Binary Format for Scenes (AABIFS). In this approach, each of the source signals is transmitted individually, along with a render cue data stream. This data stream carries time-varying values of the parameters of a spatial audio scene rendering system such as the one depicted in FIG. 1A. This set of parameters may be provided in the form of a format-independent audio scene description, such that the soundtrack may be rendered in any target spatial audio format by designing the rendering system according to this format. Each source signal, in combination with its associated render cues, defines an "audio object". A significant advantage of this approach is that the renderer can implement the most accurate spatial audio synthesis technique available to render each audio object in any target spatial audio format selected at the reproduction end. Another advantage of object-based audio scene coding systems is that they allow for interactive modifications of the rendered audio scene at the decoding stage, including remixing, music re-interpretation (e.g. karaoke), or virtual navigation in the scene (e.g. gaming).

While object-based audio scene coding enables format-independent sound track encoding and reproduction, this approach presents two major limitations: (1) it is not compatible with legacy consumer surround sound systems; (2) it typically requires a computationally expensive decoding and rendering system; and (3) it requires a high transmission or storage data rate for carrying the multiple source signals separately.

Multi-Channel Spatial Audio Coding

The need for low-bit-rate transmission or storage of multi-channel audio signal has motivated the development of new frequency-domain Spatial Audio Coding (SAC) techniques, including Binaural Cue Coding (BCC) and MPEG-Surround. In an exemplary SAC technique, illustrated in FIG. 1D, a M-channel audio signal is encoded in the form of a downmix audio signal accompanied by a spatial cue data stream that describes, in the time-frequency domain, the inter-channel relationships present in the original M-channel signal (inter-channel correlation and level differences). Because the downmix signal comprises fewer than M audio channels and the spatial cue data rate is small compared to the audio signal data rate, this coding approach yields a significant overall data rate reduction. Additionally, the downmix format may be chosen to facilitate backward compatibility with legacy equipment.

In a variant of this approach, called Spatial Audio Scene Coding (SASC) as described in U.S. Patent Application No. 2007/0269063, the time-frequency spatial cue data transmitted to the decoder are format independent. This enables spatial reproduction in any target spatial audio format, while retaining the ability to carry a backward-compatible downmix signal in the encoded soundtrack data stream. However, in this approach, the encoded soundtrack data does not define separable audio objects. In most recordings, multiple sound sources located at different positions in the sound scene are concurrent in the time-frequency domain. In this case, the spatial audio decoder is not able to separate their contributions in the downmix audio signal. As a result, the spatial fidelity of the audio reproduction may be compromised by spatial localization errors.

Spatial Audio Object Coding

MPEG Spatial Audio Object Coding (SAOC) is similar to MPEG-Surround in that the encoded soundtrack data stream includes a backward-compatible downmix audio signal along with a time-frequency cue data stream. SAOC is a multiple object coding technique designed to transmit a number M of audio objects in a mono or two-channel downmix audio signal. The SAOC cue data stream transmitted along with the SAOC downmix signal includes time-frequency object mix cues that describe, in each frequency sub band, the mixing coefficient applied to each object input signal in each channel of the mono or two-channel downmix signal. Additionally, the SAOC cue data stream includes frequency-domain object separation cues which allow the audio objects to be post-processed individually at the decoder side. The object post-processing functions provided in the SAOC decoder mimic the capabilities of an object-based spatial audio scene rendering system and support multiple target spatial audio formats.

SAOC provides a method for low-bit-rate transmission and computationally efficient spatial audio rendering of multiple audio object signals along with an object-based and format independent three-dimensional audio scene description. However, the legacy compatibility of a SAOC encoded stream is limited to two-channel stereo reproduction of the SAOC audio downmix signal, and therefore not suitable for extending existing multi-channel surround-sound coding formats. Furthermore, it should be noted that the SAOC downmix signal is not perceptually representative of the rendered audio scene if the rendering operations applied in the SAOC decoder on the audio object signals include certain types of post-processing effects, such as artificial reverberation (because these effects would be audible in the rendering scene but are not simultaneously incorporated in the downmix signal, which contains the unprocessed object signals).

Additionally, SAOC suffers from the same limitation as the SAC and SASC techniques: the SAOC decoder cannot fully separate in the downmix signal the audio object signals that are concurrent in the time-frequency domain. For example, extensive amplification or attenuation of an object by the SAOC decoder typically yields an unacceptable decrease in the audio quality of the rendered scene.

In view of the ever increasing interest and utilization of spatial audio reproduction in entertainment and communication, there is a need in the art for an improved three-dimensional audio soundtrack encoding method and associated spatial audio scene reproduction technique.

BRIEF SUMMARY

The present invention provides a novel end-to-end solution for creating, encoding, transmitting, decoding and reproducing spatial audio soundtracks. The provided soundtrack encoding format is compatible with legacy surround-sound encoding formats, so that soundtracks encoded in the new format may be decoded and reproduced on legacy playback equipment with no loss of quality compared to legacy formats. In the present invention, the soundtrack data stream includes a backward-compatible mix and additional audio channels that the decoder can remove from the backward-compatible mix. The present invention enables reproducing a soundtrack in any target spatial audio format. It is not necessary to specify the target spatial audio format at the encoding stage, and it is independent from the legacy spatial audio format of the backward-compatible mix. Each additional audio channel is interpreted by the decoder as object audio data and associated with object render cues, transmitted in the soundtrack data stream, that describe perceptually the contribution of an audio object in the soundtrack, irrespective of the target spatial audio format.

The invention allows the producer of the soundtrack to define one or more selected audio objects that will be rendered with the maximum possible fidelity in any target spatial audio format (existing today or to be developed in the future), only constrained by soundtrack delivery and reproduction conditions (storage or transmission data rate, capabilities of the playback device and playback system configuration). In addition to flexible object-based three dimensional audio reproduction, the provided soundtrack encoding format enables uncompromised backward- and forward-compatible encoding of soundtracks produced in high-resolution multi-channel audio formats such as the NHK 22.2 format or the like.

In one embodiment of the present invention, there is provided a method of encoding an audio soundtrack. The method commences by receiving a base mix signal representing a physical sound; at least one object audio signal, each object audio signal having at least one audio object component of the audio soundtrack; at least one object mix cue stream, the object mix cue streams defining mixing parameters of the object audio signals; at least one object render cue stream, the object render cue streams defining rendering parameters of the object audio signals. The method continues by utilizing the object audio signals and the object mix cue streams to combine the audio object components with the base mix signal, thereby obtaining a downmix signal. The method continues by multiplexing the downmix signal, the object audio signal, the render cue streams, and the object cue streams to form a soundtrack data stream. The object audio signals may be encoded by a first audio encoding processor before outputting the downmix signal. The object audio signals may be decoded by a first audio decoding processor. The downmix signal may be encoded by a second audio encoding processor before being multiplexed. The second audio encoding processor may be a lossy digital encoding processor.

In an alternative embodiment of the present invention, there is provided a method of decoding an audio soundtrack, representing a physical sound. The method commences by receiving a soundtrack data stream, having a downmix signal representing an audio scene; at least one object audio signal, the object audio signal having at least one audio object component of the audio soundtrack; at least one object mix cue stream, the object mix cue streams defining mixing parameters of the object audio signals; and at least one object render cue stream, the object render cue stream defining rendering parameters of the object audio signals. The method continues by utilizing the object audio signals and the object mix cue streams to partially remove at least one audio object component from the downmix signal, thereby obtaining a residual downmix signal. The method continues by applying a spatial format conversion to the residual downmix signal, thereby outputting a converted residual downmix signal having spatial parameters defining the spatial audio format. The method continues by utilizing the object audio signals and the object render cue streams to derive at least one object rendering signal. The method finishes by combining the converted residual downmix signal and the object rendering signal to obtain a soundtrack rendering signal. The audio object component may be subtracted from the downmix signal. The audio object component may be partially removed from the downmix signal such that the audio object component is unnoticeable in the downmix signal. The downmix signal may be an encoded audio signal. The downmix signal may be decoded by an audio decoder. The object audio signals may be mono audio signals. The object audio signals may be multi-channel audio signals having at least 2 channels. The object audio signals may be discrete loudspeaker-feed audio channels. The audio object components may be voices, instruments, sound effects, or any other characteristic of the audio scene. The spatial audio format may represent a listening environment.

In an alternative embodiment of the present invention, there is provided an audio encoding processor, comprising a receiver processor for receiving a base mix signal representing a physical sound; at least one object audio signal, each object audio signal having at least one audio object component of the audio soundtrack; at least one object mix cue stream, the object mix cue streams defining mixing parameters of the object audio signals; and at least one object render cue stream, the object render cue streams defining rendering parameters of the object audio signals. The encoding processor further includes a combining processor for combining the audio object components with the base mix signal based on the object audio signals and the object mix cue streams, the combining processor outputting a downmix signal. The encoding processor further includes a multiplexer processor for multiplexing the downmix signal, the object audio signal, the render cue streams, and the object cue streams to form a soundtrack data stream. In an alternative embodiment of the present invention, there is provided an audio decoding processor, comprising a receiving processor for receiving: a downmix signal representing an audio scene; at least one object audio signal, the object audio signal having at least one audio object component of the audio scene; at least one object mix cue stream, the object mix cue streams defining mixing parameters of the object audio signals; and at least one object render cue stream, the object render cue stream defining rendering parameters of the object audio signals.

The audio decoding processor further includes an object audio processor for partially removing at least one audio object component from the downmix signal based on the object audio signals and the object mix cue streams, and outputting a residual downmix signal. The audio decoding processor further includes a spatial format converter for applying a spatial format conversion to the residual downmix signal, thereby outputting a converted residual downmix signal having spatial parameters defining the spatial audio format. The audio decoding processor further includes a rendering processor for processing the object audio signals and the object render cue streams to derive at least one object rendering signal. The audio decoding processor further includes a combining processor for combining the converted residual downmix signal and the object rendering signal to obtain a soundtrack rendering signal.

In an alternative embodiment of the present invention an alternative method of decoding an audio soundtrack, representing a physical sound, is provided. The method comprising the steps of receiving a soundtrack data stream, having a downmix signal representing an audio scene; at least one object audio signal, the object audio signal having at least one audio object component of the audio soundtrack; and at least one object render cue stream, the object render cue stream defining rendering parameters of the object audio signals; utilizing the object audio signals and the object render cue streams to partially remove at least one audio object component from the downmix signal, thereby obtaining a residual downmix signal; applying a spatial format conversion to the residual downmix signal, thereby outputting a converted residual downmix signal having spatial parameters defining the spatial audio format; utilizing the object audio signals and the object render cue streams to derive at least one object rendering signal; and combining the converted residual downmix signal and the object rendering signal to obtain a soundtrack rendering signal.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 1C is a schematic view depicting the prior-art "NHK 22.2" three-dimensional multi-channel loudspeaker layout configuration;

FIG. 2 is a block diagram of a processing block performing audio object inclusion, in accordance with one aspect of the encoder;

FIG. 3 is a block diagram of an audio object renderer in accordance with one aspect of the encoder;

FIG. 5 is a block diagram of a processing block performing audio object removal, in accordance with one aspect of the decoder;

DETAILED DESCRIPTION

Figure 1:
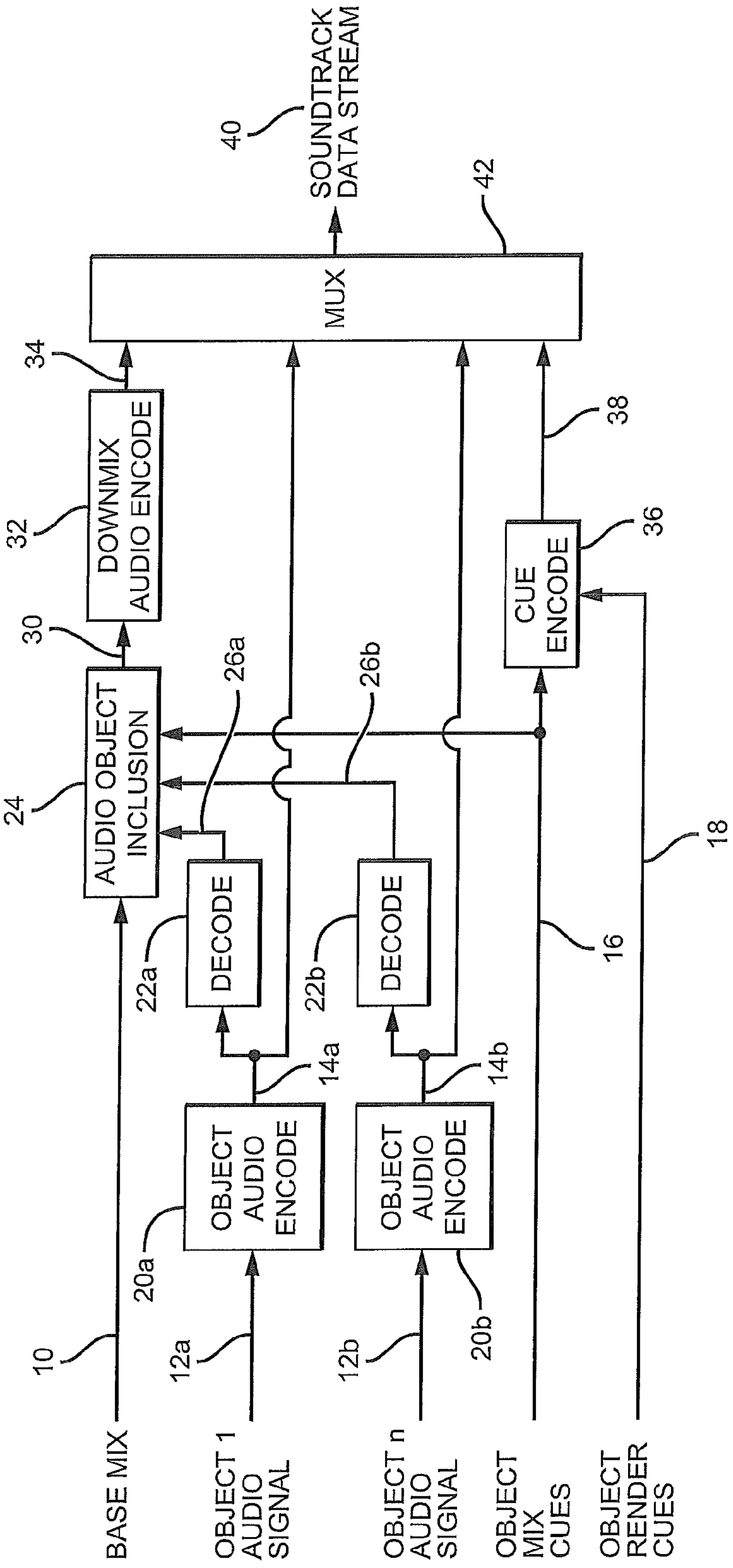
FIG. 1 is a block diagram of an encoder in accordance with one aspect of the present invention.
Figure 1A:
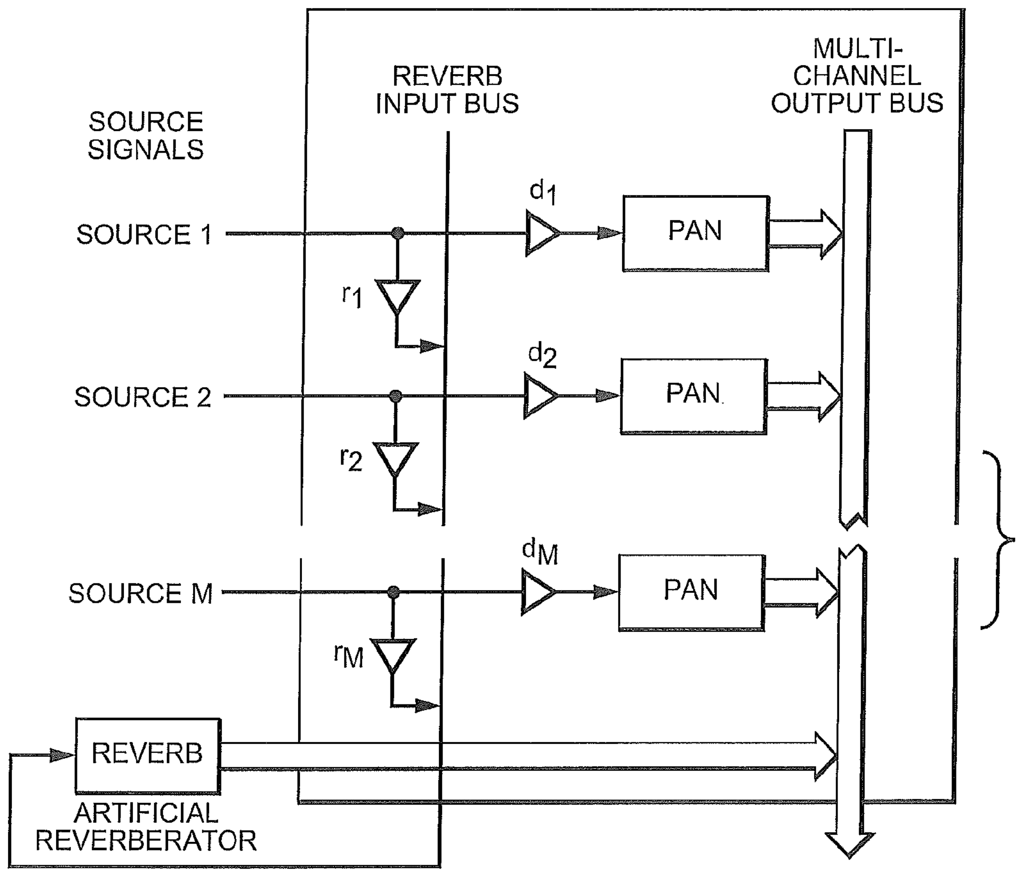
FIG. 1A PRIOR ART
FIG. 1A is a block diagram illustrating a prior-art audio processing system for the recording or reproduction of spatial sound recordings.
Figure 1B:
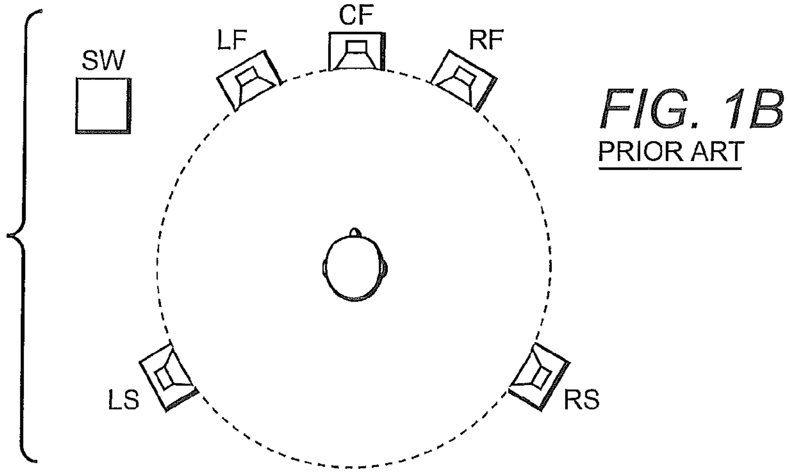
FIG. 1B PRIOR ART
FIG. 1B is a schematic top-down view illustrating the prior-art standard "5.1" surround-sound multi-channel loudspeaker layout configuration.
Figure 1D:
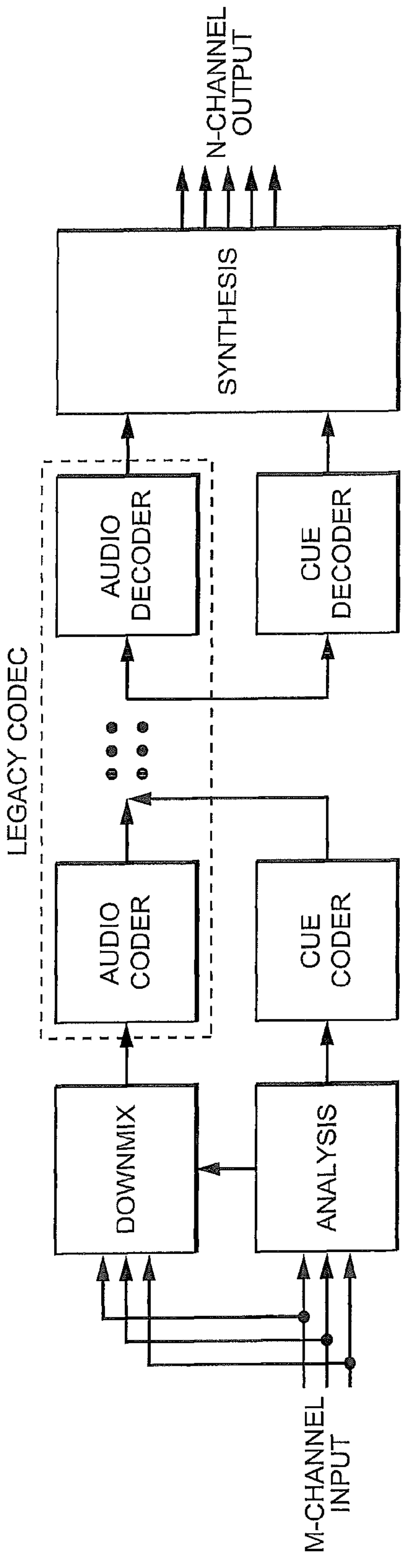
FIG. 1D PRIOR ART
FIG. 1D is a block diagram illustrating the prior-art operations of Spatial Audio Coding, Spatial Audio Scene Coding and Spatial Audio Object Coding systems.

The detailed description set forth below in connection with the appended drawings is intended as a description of the presently preferred embodiment of the invention, and is not intended to represent the only form in which the present invention may be constructed or utilized. The description sets forth the functions and the sequence of steps for developing and operating the invention in connection with the illustrated embodiment. It is to be understood, however, that the same or equivalent functions and sequences may be accomplished by different embodiments that are also intended to be encompassed within the spirit and scope of the invention. It is further understood that the use of relational terms such as first and second, and the like are used solely to distinguish one from another entity without necessarily requiring or implying any actual such relationship or order between such entities.

GENERAL DEFINITIONS

The present invention concerns processing audio signals, which is to say signals representing physical sound. These signals are represented by digital electronic signals. In the discussion which follows, analog waveforms may be shown or discussed to illustrate the concepts; however, it should be understood that typical embodiments of the invention will operate in the context of a time series of digital bytes or words, said bytes or words forming a discrete approximation of an analog signal or (ultimately) a physical sound. The discrete, digital signal corresponds to a digital representation of a periodically sampled audio waveform. As is known in the art, for uniform sampling, the waveform must be sampled at a rate at least sufficient to satisfy the Nyquist sampling theorem for the frequencies of interest. For example, in a typical embodiment a uniform sampling rate of approximately 44.1 thousand samples/second may be used. Higher sampling rates such as 96 khz may alternatively be used. The quantization scheme and bit resolution should be chosen to satisfy the requirements of a particular application, according to principles well known in the art. The techniques and apparatus of the invention typically would be applied interdependently in a number of channels. For example, it could be used in the context of a "surround" audio system (having more than two channels).

As used herein, a "digital audio signal" or "audio signal" does not describe a mere mathematical abstraction, but instead denotes information embodied in or carried by a physical medium capable of detection by a machine or apparatus. This term includes recorded or transmitted signals, and should be understood to include conveyance by any form of encoding, including pulse code modulation (PCM), but not limited to PCM. Outputs or inputs, or indeed intermediate audio signals could be encoded or compressed by any of various known methods, including MPEG, ATRAC, AC3, or the proprietary methods of DTS, Inc. as described in U.S. Pat. Nos. 5,974,380; 5,978,762; and 6,487,535. Some modification of the calculations may be required to accommodate that particular compression or encoding method, as will be apparent to those with skill in the art.

The present invention is described as an audio codec. In software, an audio codec is a computer program that formats digital audio data according to a given audio file format or streaming audio format. Most codecs are implemented as libraries which interface to one or more multimedia players, such as QuickTime Player, XMMS, Winamp, Windows Media Player, Pro Logic, or the like. In hardware, audio codec refers to a single or multiple devices that encode analog audio as digital signals and decode digital back into analog. In other words, it contains both an ADC and DAC running off the same clock.

An audio codec may be implemented in a consumer electronics device, such as a DVD or BD player, TV tuner, CD player, handheld player, Internet audio/video device, a gaming console, a mobile phone, or the like. A consumer electronic device includes a Central Processing Unit (CPU), which may represent one or more conventional types of such processors, such as an IBM PowerPC, Intel Pentium (x86) processors, and so forth. A Random Access Memory (RAM) temporarily stores results of the data processing operations performed by the CPU, and is interconnected thereto typically via a dedicated memory channel. The consumer electronic device may also include permanent storage devices such as a hard drive, which are also in communication with the CPU over an i/o bus. Other types of storage devices such as tape drives, optical disk drives may also be connected. A graphics card is also connected to the CPU via a video bus, and transmits signals representative of display data to the display monitor. External peripheral data input devices, such as a keyboard or a mouse, may be connected to the audio reproduction system over a USB port. A USB controller translates data and instructions to and from the CPU for external peripherals connected to the USB port. Additional devices such as printers, microphones, speakers, and the like may be connected to the consumer electronic device.

The consumer electronic device may utilize an operating system having a graphical user interface (GUI), such as WINDOWS from Microsoft Corporation of Redmond, Wash., MAC OS from Apple, Inc. of Cupertino, Calif., various versions of mobile GUIs designed for mobile operating systems such as Android, and so forth. The consumer electronic device may execute one or more computer programs. Generally, the operating system and computer programs are tangibly embodied in a computer-readable medium, e.g. one or more of the fixed and/or removable data storage devices including the hard drive. Both the operating system and the computer programs may be loaded from the aforementioned data storage devices into the RAM for execution by the CPU. The computer programs may comprise instructions which, when read and executed by the CPU, cause the same to perform the steps to execute the steps or features of the present invention.

The audio codec may have many different configurations and architectures. Any such configuration or architecture may be readily substituted without departing from the scope of the present invention. A person having ordinary skill in the art will recognize the above described sequences are the most commonly utilized in computer-readable mediums, but there are other existing sequences that may be substituted without departing from the scope of the present invention.

Elements of one embodiment of the audio codec may be implemented by hardware, firmware, software or any combination thereof. When implemented as hardware, the audio codec may be employed on one audio signal processor or distributed amongst various processing components. When implemented in software, the elements of an embodiment of the present invention are essentially the code segments to perform the necessary tasks. The software preferably includes the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information.

Examples of the processor readable medium include an electronic circuit, a semiconductor memory device, a read only memory (ROM), a flash memory, an erasable ROM (EROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operation described in the following. The term "data" here refers to any type of information that is encoded for machine-readable purposes. Therefore, it may include program, code, data, file, etc.

All or part of an embodiment of the invention may be implemented by software. The software may have several modules coupled to one another. A software module is coupled to another module to receive variables, parameters, arguments, pointers, etc. and/or to generate or pass results, updated variables, pointers, etc. A software module may also be a software driver or interface to interact with the operating system running on the platform. A software module may also be a hardware driver to configure, set up, initialize, send and receive data to and from a hardware device.

One embodiment of the invention may be described as a process which is usually depicted as a flowchart, a flow diagram, a structure diagram, or a block diagram. Although a block diagram may describe the operations as a sequential process, many of the operations can be performed in parallel or concurrently. In addition, the order of the operations may be re-arranged. A process is terminated when its operations are completed. A process may correspond to a method, a program, a procedure, etc.

Encoder Overview

Now referring to FIG. 1, a schematic diagram depicting an implementation of an encoder is provided. FIG. 1 depicts an encoder for encoding a soundtrack in accordance with the present invention. The encoder produces a soundtrack data stream 40 which includes the recorded soundtrack in the form of a downmix signal 30, recorded in a chosen spatial audio format. In the following description, this spatial audio format is referred to as the downmix format. In a preferred embodiment of the encoder, the downmix format is a surround sound format compatible with legacy consumer decoders, and the downmix signal 30 is encoded by a digital audio encoder 32, thereby producing an encoded downmix signal 34. A preferred embodiment of the encoder 32 is a backward-compatible multichannel digital audio encoder such as DTS Digital Surround or DTS-HD from DTS, Inc.

Additionally, the soundtrack data stream 40 includes at least one audio object (referred to in the present description and the appended figures as 'Object 1'). In the following description, an audio object is generally defined as an audio component of a soundtrack. Audio objects may represent distinguishable sound sources (voices, instruments, sound effects, etc.) that are audible in the soundtrack. Each audio object is characterized by an audio signal (12*a*, 12*b*), hereafter referred to as object audio signal and having a unique identifier in the soundtrack data. In addition to the object audio signals, the encoder optionally receives a multichannel base mix signal 10, provided in the downmix format. This base mix may represent, for instance, background music, recorded ambiance, or a recorded or synthesized sound scene.

The contributions of all audio objects in the downmix signal 30 are defined by object mix cues 16 and combined together with the base mix signal 10 by the Audio Object Inclusion processing block 24 (described below in further detail). In addition to object mix cues 16, the encoder receives object render cues 18 and includes them, along with the object mix cues 16, in the soundtrack data stream 40, via the cue encoder 36. The render cues 18 allow the complementary decoder (described below) to render the audio objects in a target spatial audio format different from the downmix format. In a preferred embodiment of the invention, the render cues 18 are format-independent, such that the decoder renders the soundtrack in any target spatial audio format. In one embodiment of the invention, the object audio signals (12*a*, 12*b*), the object mix cues 16, the object render cues 18 and the base mix 10 are provided by an operator during the production of the soundtrack.

Each object audio signal (12*a*, 12*b*) may be presented as a mono or multichannel signal. In a preferred embodiment, some or all of the object audio signals (12*a*, 12*b*) and the downmix signal 30 are encoded by low-bit-rate audio encoders (20a-20b, 32) before inclusion in the soundtrack data stream 40, in order to reduce the data rate required for transmission or storage of the encoded soundtrack 40. In a preferred embodiment, an object audio signal (12a-12b) that is transmitted via a lossy low-bit-rate digital audio encoder (20a) is subsequently decoded by a complementary decoder (22a) before processing by the Audio Object Inclusion processing block 24. This enables exact removal of the object's contribution from the downmix on the decoder side (as described below).

Subsequently, the encoded audio signals (22a-22b, 34) and the encoded cues 38 are multiplexed by block 42 to form the soundtrack data stream 40. The multiplexer 42 combines the digital data streams (22a-22b, 34, 38) into a single data stream for transmission or storage over a shared medium. The multiplexed data stream 40 is transmitted over a communication channel, which may be a physical transmission medium. The multiplexing divides the capacity of low-level communication channels into several higher-level logical channels, one for each data stream to be transferred. A reciprocal process, known as demultiplexing, can extract the original data streams on the decoder side.

Audio Object Inclusion

FIG. 2 depicts an Audio Object Inclusion processing module according to a preferred embodiment of the present invention. The Audio Object Inclusion module 24 receives the object audio signals 26a-26b and the object mix cues 16, and transmits them to the audio object renderer 44, which combines the audio objects into the audio object downmix signal 46. The audio object downmix signal 46 is provided in the downmix format and is combined with the base mix signal 10 to produce the soundtrack downmix signal 30. Each object audio signal 26a-26b may be presented as a mono or multichannel signal. In one embodiment of the invention, a multichannel object signal is treated as a plurality of single-channel object signals.

FIG. 3 depicts an Audio Object Renderer module according to an embodiment of the present invention. The Audio Object Renderer module 44 receives the object audio signals 26a-26b and the object mix cues 16, and derives the object downmix signal 46. The Audio Object Renderer 44 operates according to principles well known in the art, described for instance in (Jot, 1997), in order to mix each of the object audio signals 26a-26b into audio object downmix signal 46. The mixing operation is performed according to instructions provided by the mix cues 16. Each object audio signal (26a, 26b) is processed by a spatial panning module (respectively 48a, 48b) which assigns a directional localization to the audio object, as perceived when listening to the object downmix signal 46. The downmix signal 46 is formed by combining additively the output signals of the object signal panning modules 48a-48b. In a preferred embodiment of the renderer, the direct contribution of each object audio signal 26a-26b in the downmix signal 46 is also scaled by a direct send coefficient (denoted $d_1$-$d_n$ in FIG. 3), in order to control the relative loudness of each audio object in the soundtrack.

In one embodiment of the renderer, an object panning module (48a) is configured in order to enable rendering the object as a spatially extended sound source, having a controllable centroid direction and a controllable spatial extent, as perceived when listening to the panning module output signal. Methods for reproducing spatially extended sources are well known in the art and described, for instance, in Jot, Jean-Marc et. al, "*Binaural Simulation of Complex Acousitc Scenes for Interactive Audio*," Presented at the 121st AES Convention 2006 Oct. 5-8, [hereinafter (Jot, 2006)], herein incorporated by reference. The spatial extent associated to an audio object can be set to reproduce the sensation of a spatially diffuse sound source (i.e., a sound source surrounding the listener).

Optionally, the Audio Object Renderer 44 is configured to produce an indirect audio object contribution for one or more audio objects. In this configuration, the downmix signal 46 also includes the output signal of a spatial reverberation module. In a preferred embodiment of the audio object renderer 44, the spatial reverberation module is formed by applying a spatial panning module 54 to the output signal 52 of an artificial reverberator 50. The panning module 54 converts the signal 52 to the downmix format, while optionally providing to the audio reverberation output signal 52 a directional emphasis, as perceived when listening to the downmix signal 30. Conventional methods of designing an artificial reverberator 50 and a reverberation panning module 54 are well known in the art and may be employed by the present invention. Alternatively, the processing module (50) may be another type of digital audio processing effect algorithm commonly used in the production of audio recordings (such as, e.g., an echo effect, a flanger effect, or a ring modulator effect). The module 50 receives a combination of the object audio signals 26a-26b wherein each object audio signal is scaled by an indirect send coefficient (denoted $r_1$-$r_n$ in FIG. 3).

Additionally, it is well known in the art to realize the direct send coefficients $d_1$-$d_n$ and the indirect send coefficients $r_1$-$r_n$ as digital filters in order to simulate the audible effects of the directivity and orientation of a virtual sound source represented by each audio object, and the effects of acoustic obstacles and partitions in the virtual audio scene. This is further described in (Jot, 2006). In one embodiment of the invention, not illustrated in FIG. 3, the Object Audio Renderer 44 includes several spatial reverberation modules associated in parallel and fed by different combinations of the Object Audio Signals, in order to simulate a complex acoustic environment.

The signal processing operations in the Audio Object Renderer 44 are performed according to instructions provided by the mix cues 16. Examples of mix cues 16 may include mixing coefficients applied in the panning modules 48a-48b, that describe the contribution of each object audio signal 26a-26b into each channel of the downmix signal 30. More generally, the object mix cue data stream 16 carries the time-varying values of a set of control parameters that uniquely determine all the signal processing operations performed by the Audio Object Renderer 44.

Decoder Overview

Figure 4:
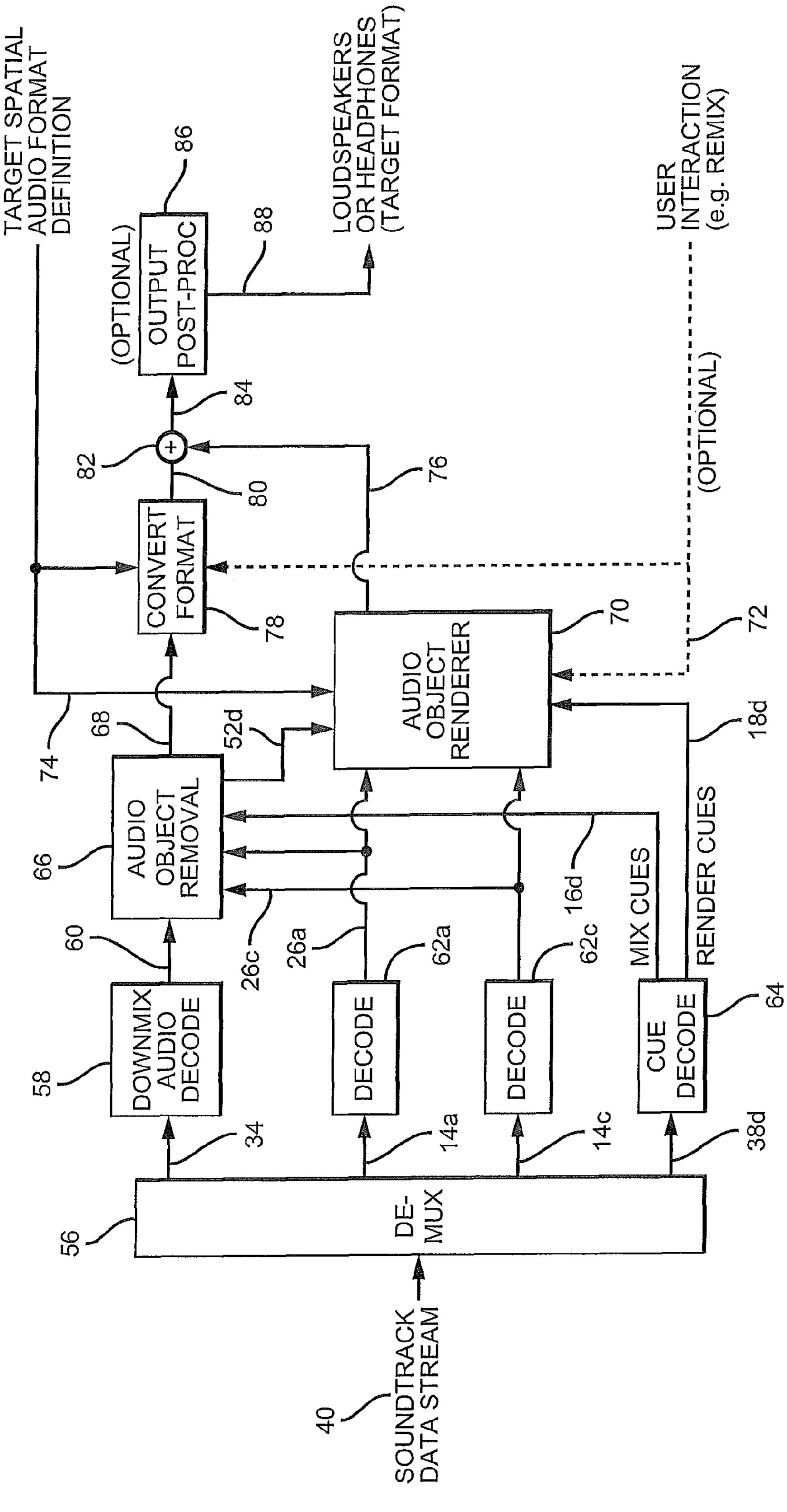
FIG. 4 is a block diagram of a decoder in accordance with one aspect of the present invention.

Referring now to FIG. 4, a decoder process according to an embodiment of the invention is illustrated. The decoder receives as input the encoded soundtrack data stream 40. The demultiplexer 56 separates the encoded input 40 in order to recover the encoded downmix signal 34, the encoded object audio signals 14a-14c, and the encoded cue stream 38d. Each encoded signal and/or stream is decoded by a decoder (respectively 58, 62a-62c and 64) complementary to the encoder used to encode the corresponding signal and/or stream in the soundtrack encoder, described in connection to FIG. 1, used to produce the soundtrack data stream 40.

The decoded downmix signal 60, object audio signals 26a-26c, and object mix cue stream 16d are provided to the Audio Object Removal module 66. The signals 60 and 26a-26c are represented in any form that permits mixing and filtering operations. For example, linear PCM may suitably be used, with sufficient bit depth for the particular application. The Audio Object Removal module 66 produces the residual downmix signal 68 in which the audio object contributions are exactly, partially, or substantially removed. The residual downmix signal 68 is provided to the Format Converter 78, which produces the converted residual downmix signal 80 suitable for reproduction in the target spatial audio format.

Additionally, the decoded object audio signals 26*a*-26*c* and the object render cue stream 18*d* are provided to the Audio Object Renderer 70, which produces the object rendering signal 76 suitable for reproduction of the audio object contributions in the target spatial audio format. The object rendering signal 76 and the converted residual downmix signal 80 are combined in order to produce the soundtrack rendering signal 84 in the target spatial audio format. In one embodiment of the invention, the output post-processing module 86 applies optional post-processing to the soundtrack rendering signal 84. In one embodiment of the invention, module 86 includes post-processing commonly applicable in audio reproduction systems, such as frequency response correction, loudness or dynamic range correction, additional spatial audio format conversion, or the like.

A person skilled in the art will readily understand that a soundtrack reproduction compatible with a target spatial audio format may be achieved by transmitting the decoded downmix signal 60 directly to the Format Converter 78, omitting the Audio Object Removal 66 and the Audio Object Renderer 70. In an alternative embodiment, the Format Converter 78 is omitted, or included in the post-processing module 80. Such variant embodiments are suitable if the downmix format and the target spatial audio format are considered equivalent and the Audio Object Renderer 70 is employed solely for the purpose of user interaction on the decoder side.

In applications of the invention wherein the downmix format and the target spatial audio format are not equivalent, it is particularly advantageous for the Audio Objet Renderer 70 to render the audio object contributions directly in the target spatial format, so that they may be reproduced with optimal fidelity and spatial accuracy, by employing in the Renderer 70 an object rendering method matched to the specific configuration of the audio playback system. In this case, the format conversion 78 is applied to the residual downmix signal 68 before combining the downmix signal with the object rendering signal 76, since object rendering is already provided in the target spatial audio format.

The provision of the downmix signal 34 and Audio Object Removal 66 is not necessary for rendering of the soundtrack in the target spatial audio format if all of the audible events in the soundtrack are provided to the decoder in the form of object audio signals 14*a*-14*c* accompanied by render cues 18*d*, as in conventional object-based scene coding. A particular advantage of including the encoded downmix signal 34 in the soundtrack data stream is that it enables backward-compatible reproduction using legacy soundtrack decoders which discard or ignore the object signals and cues provided in the soundtrack data stream.

Further, a particular advantage of incorporating the Audio Object Removal function in the decoder is that the Audio Object Removal step 66 makes it possible to reproduce all the audible events that compose the soundtrack while transmitting, removing and rendering only a selected subset of the audible events as audio objects, thereby significantly reducing transmission data rate and decoder complexity requirements. In an alternative embodiment of the invention (not shown in FIG. 4), one of the object audio signals (26*a*) transmitted to the Audio Object Renderer 70 is, for a period of time, equal to an audio channel signal of the downmix signal 60. In this case, and for the same period of time, the audio object removal operation 66 for that object consists simply of muting the audio channel signal in the downmix signal 60, and it is unnecessary to receive and decode the object audio signal 14*a*. This further reduces transmission data rate and decoder complexity.

In a preferred embodiment, when the transmission data rate or the soundtrack playback device computational capabilities are limited, the set of object audio signals 14*a*-14*c* decoded and rendered on the decoder side (FIG. 4) is an incomplete subset of the set of object audio signals 14*a*-14*b* encoded on the encoder side (FIG. 1). One or more objects may be discarded in the multiplexer 42 (thereby reducing transmission data rate) and/or in the demultiplexer 56 (thereby reducing decoder computational requirements). Optionally, object selection for transmission and/or rendering may be determined automatically by a prioritization scheme whereby each object is assigned a priority cue included in the cue data stream 38/38*d*.

Audio Object Removal

Referring now to FIGS. 4 and 5, an Audio Object Removal processing module according to an embodiment of the invention is illustrated. The Audio Object Removal processing module 66 performs, for the selected set of objects to be rendered, the reciprocal operation of the Audio Object Inclusion module provided in the encoder. The module receives the object audio signals 26*a*-26*c* and the associated object mix cues 16*d*, and transmits them to the Audio Object Renderer 44*d*. The Audio Object Renderer 44*d* replicates, for the selected set of objects to be rendered, the signal processing operations performed in the Audio Object Renderer 44 provided on the encoding side, described previously in connection to FIG. 3. The Audio Object Renderer 44*d* combines the selected audio objects into the audio object downmix signal 46*d*, which is provided in the downmix format and is subtracted from the downmix signal 60 to produce the residual downmix signal 68. Optionally, the Audio Object Removal also outputs a reverberation output signal 52*d* provided by the Audio Object Renderer 44*d*.

The Audio Object Removal does not need to be an exact subtraction. The purpose of the Audio Object Removal 66 is to make the selected set of objects substantially or perceptually unnoticeable in listening to the residual downmix signal 68. Therefore, the downmix signal 60 does not need to be encoded in a lossless digital audio format. If it is encoded and decoded using a lossy digital audio format, an arithmetic subtraction of the audio object downmix signal 46*d* from the decoded downmix signal 60 may not exactly eliminate the audio object contributions from the residual downmix signal 68. However, this error is substantially unnoticeable in listening to the soundtrack rendering signal 84, because it is substantially masked as a result of subsequently combining the object rendering signal 76 into the soundtrack rendering signal 84.

Therefore, the realization of the decoder according to the invention does not preclude the decoding of the downmix signal 34 using a lossy audio decoder technology. It is advantageous for the data rate necessary for transmitting the soundtrack data to be significantly reduced by adopting a lossy digital audio codec technology in the downmix audio encoder 32 in order to encode the downmix signal 30 (FIG. 1). It is further advantageous for the complexity of the downmix audio decoder 58 to be reduced by performing a lossy decoding of the downmix signal 34, even if it is transmitted in a lossless format (e.g. DTS Core decoding of a downmix signal data stream transmitted in high-definition or lossless DTS-HD format).

Audio Object Rendering

Figure 6:
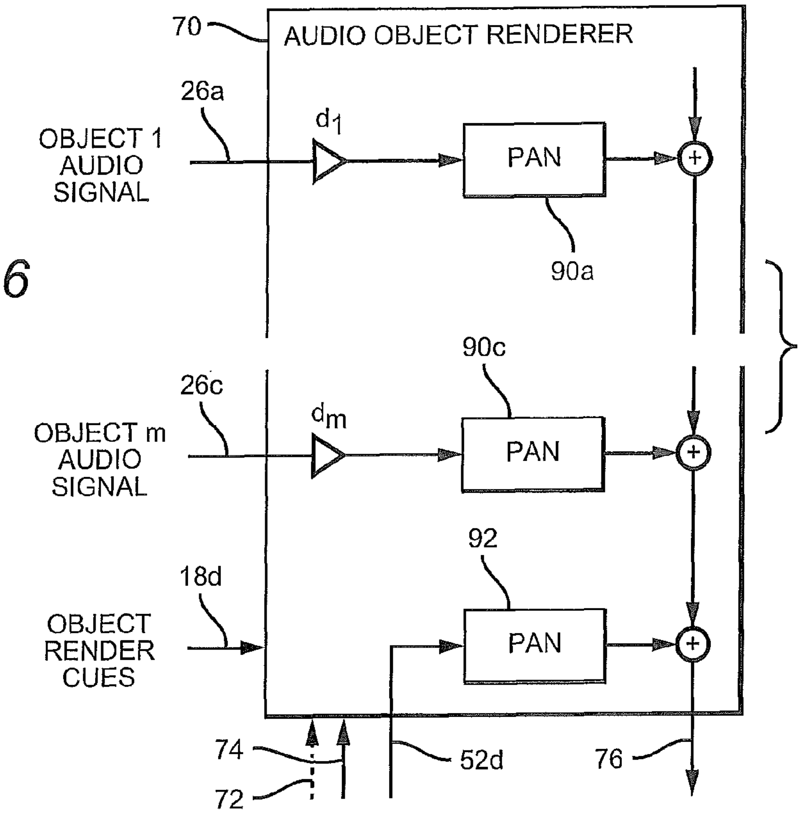
FIG. 6 is a block diagram of an audio object renderer in accordance with one aspect of the decoder.

FIG. 6 depicts a preferred embodiment of the Audio Object Renderer module 70. The Audio Object Renderer module 70 receives the object audio signals 26*a*-26*c* and the object render cues 18*d*, and derives the object rendering signal 76. The Audio Object Renderer 70 operates according to principles well known in the art, reviewed previously in connection to the Audio Object Renderer 44 described in FIG. 3, in order to mix each of the object audio signals 26*a*-26*c* into audio the object rendering signal 76. Each object audio signal (26*a*, 26*c*) is processed by a spatial panning module (90*a*, 90*c*) which assigns a directional localization to the audio object, as perceived when listening to the object rendering signal 76. The object rendering signal 76 is formed by combining additively the output signals of the panning modules 90*a*-90*c*. The direct contribution of each object audio signal (26*a*, 26*c*) in the object rendering signal 76 is scaled by a direct send coefficient ($d_1$, $d_m$). Additionally the object rendering signal 76 includes the output signal of a reverberation panning module 92, which receives the reverberation output signal 52*d* provided by the Audio Object Renderer 44*d* included in the Audio Object Removal module 66.

In one embodiment of the invention, the audio object downmix signal 46*d* produced by the Audio Object Renderer 44*d* (in the Audio Object Removal module 66 shown in FIG. 5) does not include the indirect audio object contributions included in the audio object downmix signal 46 produced by the Audio Object Renderer 44 (in the Audio Object Inclusion module 24 shown on FIG. 2). In this case, the indirect audio object contributions remain in the residual downmix signal 68 and the reverberation output signal 52*d* is not provided. This embodiment of the soundtrack decoder object of the invention provides improved positional audio rendering of the direct object contributions without requiring reverberation processing in the Audio Object Renderer 44*d*.

The signal processing operations in the Audio Object Renderer module 70 are performed according to instructions provided by the render cues 18*d*. The panning modules (90*a*-90*c*, 92) are configured according to the target spatial audio format definition 74. In a preferred embodiment of the invention, the render cues 18*d* are provided in the form of a format-independent audio scene description and all signal processing operations in Audio Object Renderer module 70, including the panning modules (90*a*-90*c*, 92) and the send coefficients ($d_1$, $d_m$), are configured such that the object rendering signal 76 reproduces the same perceived spatial audio scene irrespective of the chosen target spatial audio format. In preferred embodiments of the invention, this audio scene is identical to the audio scene reproduced by the object downmix signal 46*d*. In such embodiments, the render cues 18*d* may be used to derive or replace the mix cues 16*d* provided to the Audio Object Renderer 44*d*; similarly, the render cues 18 may be used to derive or replace the mix cues 16 provided to the Audio Object Renderer 44; therefore, the object mix cues (16, 16*d*) do not need to be provided.

In preferred embodiments of the invention, the format-independent object render cues (18, 18*d*) include the perceived spatial position of each audio object, expressed in Cartesian or polar coordinates, either absolute or relative to the virtual position and orientation of the listener in the audio scene. Alternative examples of format-independent render cues are provided in various audio scene description standards such as OpenAL or MPEG-4 Advanced Audio BIFS. These scene description standards include, in particular, reverberation and distance cues sufficient for uniquely determining the values of the send coefficients ($d_1$-$d_n$ and $r_1$-$r_n$ in FIG. 3 and FIG. 5) and the processing parameters of the artificial reverberator 50 and reverberation panning modules (54, 92).

The digital audio soundtrack encoder and decoder object of the present invention may be advantageously applied to backward-compatible and forward-compatible encoding of audio recordings originally provided in a multi-channel audio source format different from the downmix format. The source format may be, for instance, a high-resolution discrete multi-channel audio format such as the NHK 22.2 format, wherein each channel signal is intended as a loudspeaker-feed signal. This may be accomplished by providing each channel signal of the original recording to the soundtrack encoder (FIG. 1) as a separate object audio signal accompanied by object render cues indicating the due position of the corresponding loudspeaker in the source format. If the multi-channel audio source format is a superset of the downmix format (including additional audio channels), each of the additional audio channels in the source format may be encoded as an additional audio object in accordance with the invention.

Another advantage of the encoding and decoding method in accordance with the invention is that it allows optional object-based modifications of the reproduced audio scene. This is achieved by controlling the signal processing performed in the Audio Object Renderer 70 according to user interaction cues 72 as shown in FIG. 6, which may modify or override some of the object render cues 18*d*. Examples of such user interaction include music remixing, virtual source repositioning, and virtual navigation in the audio scene. In one embodiment of the invention, the cue data stream 38 includes object properties uniquely assigned to each object, including properties identifying the sound source associated to an object (e.g. character name or instrument name), indicating the nature of the sound source (e.g. 'dialogue' or 'sound effect'), or defining a set of audio objects as a group (a composite object that may be manipulated as a whole). The inclusion of such object properties in the cue stream enables additional applications, such as dialogue intelligibility enhancement (applying specific processing to dialogue object audio signals in the Audio Object Renderer 70).

In another embodiment of the invention (not shown on FIG. 4), a selected object is removed from the downmix signal 68 and the corresponding object audio signal (26*a*) is replaced by a different audio signal received separately and provided to the Audio Object Renderer 70. This embodiment is advantageous in applications such as multi-lingual movie soundtrack reproduction or karaoke and other forms of music re-interpretation. Furthermore, additional audio objects, not included in the soundtrack data stream 40, may be provided separately to the Audio Object Renderer 70 in the form of additional audio object signals associated with object render cues. This embodiment of the invention is advantageous, for example, in interactive gaming applications. In such embodiments, it is advantageous for the Audio Object Renderer 70 to incorporate one or more spatial reverberation modules as described previously in the description of the Audio Object Renderer 44.

Downmix Format Conversion

As described previously in connection to FIG. 4, the soundtrack rendering signal 84 is obtained by combining the object rendering signal 76 with the converted residual downmix signal 80, obtained by format conversion 78 of the residual downmix signal 68. The spatial audio format conversion 78 is configured according to the target spatial audio format definition 74, and may be practiced by a technique suitable for reproducing, in the target spatial audio format, the audio scene represented by the residual downmix signal 68. Format conversion techniques known in the art include multichannel upmixing, downmixing, remapping or virtualization.

Figure 7:
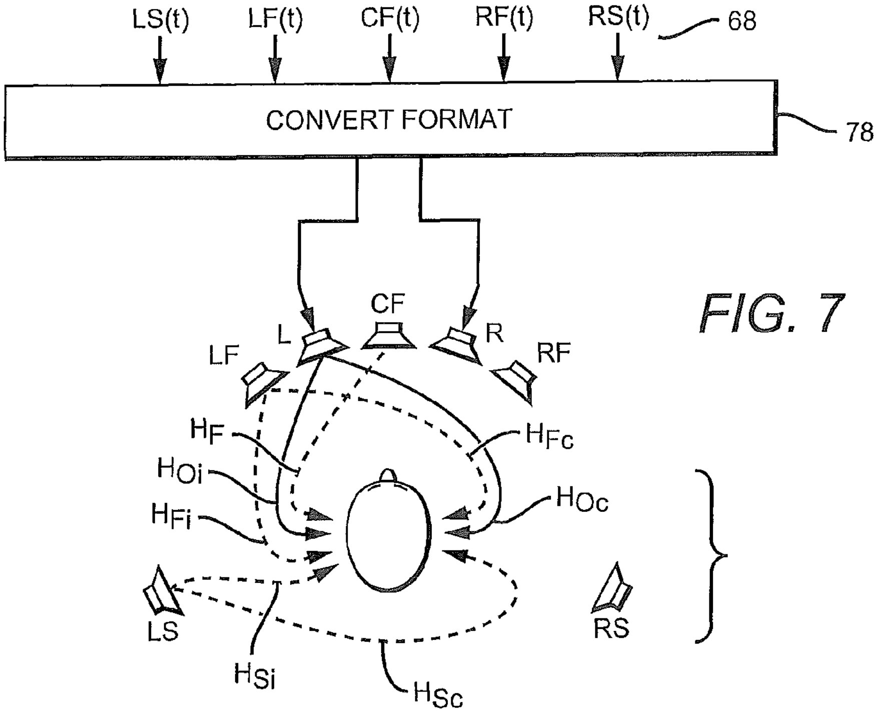
FIG. 7 is a schematic illustration of a format conversion method in accordance with one embodiment of the decoder.

In one embodiment of the invention, as illustrated in FIG. 7, the target spatial audio format is two-channel playback over loudspeakers or headphones, and the downmix format is the 5.1 surround sound format. The format conversion is performed by a virtual audio processing apparatus as described U.S. Patent Application No. 2010/0303246 herein incorporated by reference. The architecture illustrated in FIG. 7 further includes the use the virtual audio speakers which are create the illusion that audio is emanated from virtual speakers. As is well-known in the art, these illusions may be achieved by applying transformations to the audio input signals taking into account measurements or approximations of the loudspeaker-to-ear acoustic transfer functions, or Head Related Transfer Functions (HRTF). Such illusions may be employed by the format conversion in accordance with the present invention.

Figure 8:
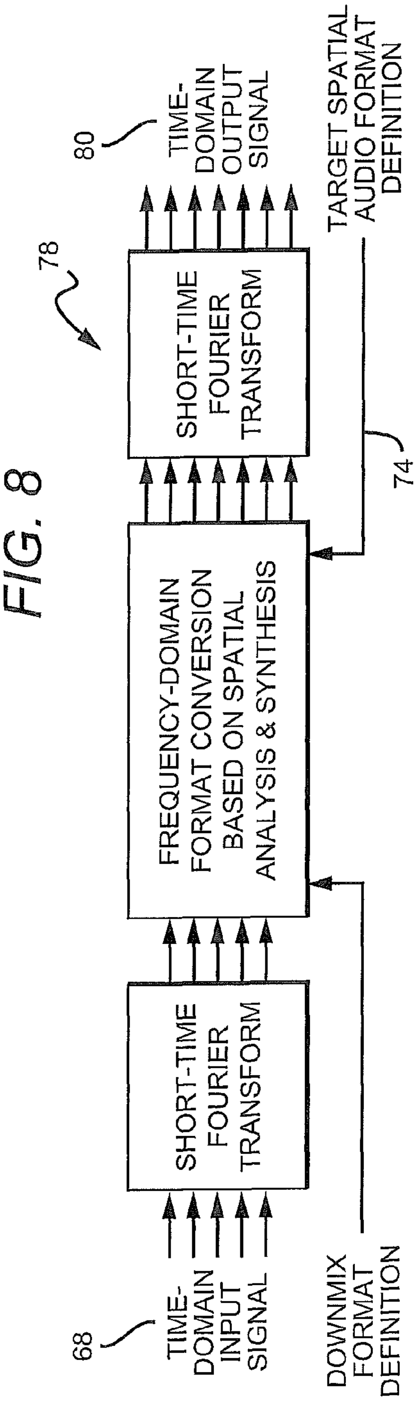
FIG. 8 is a block diagram illustrating a format conversion method in accordance with one embodiment of the decoder.

Alternatively, in the embodiment illustrated in FIG. 7 where the target spatial audio format is two-channel playback over loudspeakers or headphones, the format converter may be implemented by frequency-domain signal processing as illustrated in FIG. 8. As described in Jot, et. al "*Binaural* 3-*D audio rendering based on spatial audio scene coding,*" Presented at 123$^{rd}$ AES Convention 2007 Oct. 5-8, herein incorporated by reference, virtual audio processing according to the SASC framework allows the format converter to perform a surround-to-3D format conversion wherein the converted residual downmix signal 80 produces, in listening over headphones or loudspeakers, a three-dimensional expansion of the spatial audio scene: audible events that were interior panned in the residual downmix signal 68 are reproduced as elevated audible events in the target spatial audio format.

Frequency-domain format conversion processing may be applied, more generally, in embodiments of the format converter 78 wherein the target spatial audio format includes more than two audio channels, as described in Jot, et. al "*Multichannel surround format conversion and generalized upmix,*" *AES* 30$^{th}$ International Conference, 2007 Mar. 15-17, herein incorporated by reference. FIG. 8 depicts a preferred embodiment wherein the residual downmix signal 68, provided in the time domain, is converted to a frequency-domain representation by the short-time Fourier transform block. The STFT-domain signal is then provided to the frequency-domain format conversion block, which implements format conversion based on spatial analysis and synthesis, provides a STFT-domain multi-channel output signal and generates the converted residual downmix signal 80 via an inverse short-time Fourier transform and overlap-add process. The downmix format definition and the target spatial audio format definition 74 are provided to the frequency-domain format conversion block for use in the passive upmix, spatial analysis, and spatial synthesis processes internal to this block, as depicted in FIG. 8. While the format conversion is shown as operating entirely in the frequency domain, those skilled in the art will recognize that in some embodiments certain components, notably the passive upmix, could be alternatively implemented in the time domain. This invention covers such variations without restriction.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show particulars of the present invention in more detail than is necessary for the fundamental understanding of the present invention, the description taken with the drawings making apparent to those skilled in the art how the several forms of the present invention may be embodied in practice.

What is claimed is:

1. A method of encoding an audio soundtrack, comprising the steps of:

receiving a base mix signal representing a physical sound;

receiving at least one object audio signal, each object audio signal having at least one audio object component of the audio soundtrack;

receiving at least one object mix cue stream, the object mix cue streams defining mixing parameters of the object audio signals;

receiving at least one object render cue stream, the object render cue streams defining rendering parameters for rendering the object audio signals in a target spatial audio format;

encoding the object audio signals by a first audio encoding processor to obtain encoded object audio signals that contain encoded audio objects;

decoding the encoded object audio signals by a first audio decoding processor;

utilizing the decoded object audio signals and the object mix cue streams to combine the audio object components with the base mix signal, thereby obtaining a downmix signal; and multiplexing the downmix signal, the encoded object audio signals, the object render cue streams, and the object mix cue streams to form a soundtrack data stream.

2. The method of claim 1, wherein the downmix signal is encoded by a second audio encoding processor before being multiplexed.

3. The method of claim 2, wherein the second audio encoding processor is a lossy digital encoding processor.

4. A method of decoding an audio soundtrack, representing a physical sound, comprising the steps of:

receiving a soundtrack data stream, having:

a downmix signal representing an audio scene;

at least one object audio signal, the object audio signals having at least one audio object component of the audio soundtrack;

at least one object mix cue stream, the object mix cue streams defining mixing parameters of the object audio signals; and at least one object render cue stream, the object render cue streams defining rendering parameters for rendering the object audio signals in a target spatial audio format;

utilizing the object audio signals and the object mix cue streams to substantially remove at least one audio object component from the downmix signal, thereby obtaining a residual downmix signal;

applying a spatial format conversion to the residual downmix signal, thereby outputting a converted residual downmix signal, wherein the spatial format conversion utilizes spatial parameters determined by the target spatial audio format;

utilizing the object audio signals and the object render cue streams to derive at least one object rendering signal; and combining the converted residual downmix signal and the object rendering signal to obtain a soundtrack rendering signal.

5. The method of claim 4, wherein the audio object component is subtracted from the downmix signal.

6. The method of claim 4, wherein the audio object component is substantially removed from the downmix signal such that the audio object component is unnoticeable in the downmix signal.

7. The method of claim 4, wherein the downmix signal is an encoded audio signal.

8. The method of claim 7, wherein the downmix signal is decoded by an audio decoder.

9. The method of claim 4, wherein the object audio signals are mono audio signals.

10. The method of claim 4, wherein the object audio signals are multi-channel audio signals having at least 2 channels.

11. The method of claim 4, wherein the object audio signals are discrete loudspeaker-feed audio channels.

12. The method of claim 4, wherein the audio object components are voices, instruments, or sound effects of the audio scene.

13. The method of claim 4, wherein the spatial audio format represents a listening environment.

14. An audio encoding processor, comprising:

a receiver processor for receiving:

a base mix signal representing a physical sound;

at least one object audio signal, each object audio signal having at least one audio object component of the audio soundtrack;

at least one object mix cue stream, the object mix cue streams defining mixing parameters of the object audio signals; and at least one object render cue stream, the object render cue streams defining rendering parameters for rendering the object audio signals in a target spatial audio format;

a first audio encoding processor for encoding the object audio signals to obtain encoded object audio signals that contain encoded audio objects;

a first audio decoding processor for decoding the encoded object audio signals;

a combining processor for combining the audio object components with the base mix signal based on the decoded object audio signals and the object mix cue streams, the combining processor outputting a downmix signal; and a multiplexer processor for multiplexing the downmix signal, the encoded object audio signals, the object render cue streams, and the object mix cue streams to form a soundtrack data stream.

15. The audio encoding processor of claim 14, wherein the downmix signal is encoded by a second audio encoding processor before being multiplexed.

16. An audio decoding processor, comprising:

a receiving processor for receiving:

a downmix signal representing an audio scene;

at least one object audio signal, the object audio signal having at least one audio object component of the audio scene;

at least one object mix cue stream, the object mix cue streams defining mixing parameters of the object audio signals; and at least one object render cue stream, the object render cue stream defining rendering parameters for rendering the object audio signals in a target spatial format;

an object audio processor for substantially removing at least one audio object component from the downmix signal based on the object audio signals and the object mix cue streams, and outputting a residual downmix signal;

a spatial format converter for applying a spatial format conversion to the residual downmix signal, thereby outputting a converted residual downmix signal, wherein the spatial format converter utilizes spatial parameters determined by the target spatial audio format;

a rendering processor for processing the object audio signals and the object render cue streams to derive at least one object rendering signal; and a combining processor for combining the converted residual downmix signal and the object rendering signal to obtain a soundtrack rendering signal.

17. The audio decoding processor of claim 16, wherein the audio object component is subtracted from the downmix signal.

18. The audio decoding processor of claim 16, wherein the audio object component is partially removed from the downmix signal such that the audio object component is unnoticeable in the downmix signal.

19. A method of decoding an audio soundtrack, representing a physical sound, comprising the steps of:

receiving a soundtrack data stream, having:

a downmix signal representing an audio scene;

at least one object audio signal, the object audio signal having at least one audio object component of the audio soundtrack; and at least one object render cue stream, the object render cue stream defining rendering parameters for rendering the object audio signals in a target spatial format;

utilizing the object audio signals and the object render cue streams to substantially remove at least one audio object component from the downmix signal, thereby obtaining a residual downmix signal;

applying a spatial format conversion to the residual downmix signal, thereby outputting a converted residual downmix signal, wherein the spatial format converter utilizes spatial parameters determined by the target spatial audio format;

utilizing the object audio signals and the object render cue streams to derive at least one object rendering signal; and combining the converted residual downmix signal and the object rendering signal to obtain a soundtrack rendering signal.

* * * * *